(12) United States Patent
Baldemair et al.

(10) Patent No.: US 9,125,184 B2
(45) Date of Patent: Sep. 1, 2015

(54) COMPROMISE RESOURCE ALLOCATION FIELD SIZE WHEN AGGREGATING COMPONENT CARRIERS OF DIFFERING SIZE

(75) Inventors: Robert Baldemair, Solna (SE); Dirk Gerstenberger, Stockholm (SE); Daniel Larsson, Solna (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/521,128

(22) PCT Filed: Jun. 30, 2010

(86) PCT No.: PCT/SE2010/050751
§ 371 (c)(1),
(2), (4) Date: Jul. 9, 2012

(87) PCT Pub. No.: WO2011/087418
PCT Pub. Date: Jul. 21, 2011

(65) Prior Publication Data
US 2013/0128828 A1 May 23, 2013

Related U.S. Application Data

(60) Provisional application No. 61/294,535, filed on Jan. 13, 2010.

(51) Int. Cl.
*H04W 72/04* (2009.01)
*H04L 5/00* (2006.01)

(52) U.S. Cl.
CPC .............. *H04W 72/04* (2013.01); *H04L 5/001* (2013.01); *H04L 5/0044* (2013.01); *H04L 5/0053* (2013.01); *H04L 5/0091* (2013.01)

(58) Field of Classification Search
None
See application file for complete search history.

(56) References Cited

U.S. PATENT DOCUMENTS

2004/0153545 A1* 8/2004 Pandya et al. ................. 709/226
2008/0137622 A1* 6/2008 Russell ......................... 370/338

OTHER PUBLICATIONS

3rd Generation Partnership Project. 3GPP TSG-RAN WG1 Meeting #59. "Discussion on PDCCH with carrier indicator."R1-094496. Jeju, Korea. Nov. 13, 2009.
3rd Generation Partnership Project. 3GPP TSG RAN WG1 Meeting #59bis. "Inclusion of CIF in PDCCH for cross-carrier scheduling." R1-1 00043. Valencia, Spain. Jan. 22, 2010.

* cited by examiner

*Primary Examiner* — Jason Mattis
*Assistant Examiner* — James P Duffy
(74) *Attorney, Agent, or Firm* — Murphy, Bilak & Homiller, PLLC

(57) ABSTRACT

Methods and arrangements for resource allocation in a telecommunication system in which aggregation of component carriers is applied. The size of the resource allocation field is determined based on the transmission bandwidth of a selection of component carriers. The selection of component carriers comprises the component carrier on which the resource allocation message is monitored and the component carriers which are cross-scheduled from said component carrier. The resource allocation message comprising the resource allocation field with the determined size is transmitted to the user equipment over a particular component carrier of the selection of component carriers. Furthermore, with only one size of the resource allocation field a smaller number of code word sizes needs to be monitored by the UE. This leads to a smaller number of blind decodings performed in the UE. The present invention enables a more tailored approach when determining the size of the resource allocation field to avoid too high overhead but also a too coarse resource allocation.

14 Claims, 7 Drawing Sheets

COMPROMISE RESOURCE ALLOCATION FIELD SIZE WHEN AGGREGATING COMPONENT CARRIERS OF DIFFERING SIZE

TECHNICAL FIELD

The present invention relates to arrangements and methods in a telecommunication network, and in particular to resource allocation in a telecommunication system in which aggregation of component carriers is applied.

BACKGROUND

FIG. 1 shows a part of a telecommunication network 10. The radio access network 10 comprises a plurality of radio base stations 11 (whereof only one is shown in the figure), each of which communicates with a plurality of user equipments 12 located in the coverage area of the radio base station. The base station 11 further communicates with a core network 13. For example, where the radio access network 10 is a standardized E-UTRAN (Evolved UMTS Terrestrial Radio Access Network), the core network 13 comprises an evolved packet core, itself comprising a mobility management entity (MME), a serving gateway and a PDN (packet data network) gateway.

The E-UTRAN uses OFDM (Orthogonal Frequency Division Multiple Access) in the downlink and DFT (Discrete Fourier Transform) spread OFDM in the uplink. The LTE downlink physical resource can thus be seen as a time-frequency grid as illustrated in FIG. 2, where each resource element 20 including a cyclic prefix 21 corresponds to one OFDM subcarrier during one OFDM symbol interval.

The E-UTRAN time-domain structure is illustrated in FIG. 3. In the time domain, downlink transmissions are organized into radio frames of 10 ms, each radio frame 30 consisting of ten equally-sized subframes 31 with a length of 1 ms. Each subframe consists of two slots of 0.5 ms and each slot consists of a number of OFDM symbols.

Furthermore, resource allocation in E-UTRAN is typically described in terms of resource blocks, where a resource block corresponds to one slot in the time domain and 12 contiguous subcarriers in the frequency domain. Resource blocks are numbered in the frequency domain, starting with 0 from one end of the system bandwidth.

Downlink (DL) transmissions could be dynamically scheduled. That is, in each subframe the radio base station transmits control information, indicating to which user equipments data is transmitted and upon which resource blocks the data is transmitted, i.e. the DL assignment, in the current downlink subframe. The DL assignment is typically transmitted in the first 1, 2, 3 or 4 OFDM symbols in each subframe. In FIG. 4 a downlink subframe 40 comprising a control region 41 is illustrated. The control region 41 includes 3 OFDM symbols 42 comprising control information. The DL assignment is transmitted in a resource allocation message as a Downlink Control Information (DCI) message on the Physical Downlink Control CHannel (PDCCH) within the control region. The UL grant is also transmitted in a resource allocation message as a Downlink Control Information (DCI) message on the Physical Downlink Control CHannel (PDCCH). Among other important parameters the DCI message contains information indicating the assigned resources for the Physical Downlink Shared CHannel (PDSCH) and UL transmission grants for the Physical Uplink Shared CHannel (PUSCH) in a resource allocation field. The size of the resource allocation field increases with the transmission bandwidth of the system, the wider the transmission bandwidth the more bits are needed to describe the resource allocation. Even though multiple resource allocation schemes exist in LTE this basic principle applies to all of them. In addition to the transmission bandwidth also the transmission mode (e.g. which kind of MIMO or no MIMO) influences the DCI payload size i.e. the size of the resource allocation field.

Each PDCCH is protected by a Cyclic Redundancy Check (CRC) and is Forward Error Correction (FEC) encoded. The CRC is masked by a pattern that depends on the UE identity of the recipient. If a PDCCH should be received by multiple terminals the scrambling does not depend on the UE identity but on a group identity, e.g. the Random Access group identity, Paging group identity, etc.

Depending on the Signal to Interference plus Noise Ratio (SINR) situation of the UE a higher or lower error protection is required for an acceptable decoding performance. Therefore the code rate of the error correction code can be adjusted, i.e. the same DCI payload size can be encoded into code words with different sizes.

For each subframe the UEs monitors the control region and tries to decode PDCCH. In order to reduce complexity the UE is only supposed to monitor PDCCH transmitted on a fraction of all available resource elements, so called search spaces. Furthermore, the UE only monitors DCI messages with a limited number of payload sizes (i.e. for a limited number of transmission modes), which translates via the different codes rates into a limited set of different code word sizes. Once it has decoded the PDCCH it calculates the CRC of the decoded payload, masks it with its own UE identity or an appropriate group identity and compares the result with the attached CRC. If the result matches the UE has decoded an assignment attended for it, otherwise it has decoded an assignment intended for someone else and discards it.

The E-UTRAN currently supports bandwidths up to 20 MHz. However, one of the requirements of future releases of this standard such as LTE Advanced is the support of bandwidths larger than 20 MHz. A further important future requirement is to assure backward compatibility with previous releases. This also includes spectrum compatibility. That would imply that a future-release carrier, wider than 20 MHz, appears as a number of carriers to a legacy UE. Each such carrier can be referred to as a component carrier. In particular for early deployments of future releases, it can be expected that there will be a smaller number of future-release UEs compared to many legacy UEs. Therefore, it is necessary to assure an efficient use of a wide carrier also for legacy UEs, i.e. that it is possible to implement carriers where legacy UEs can be scheduled in all parts of the wideband future-release carrier. The straightforward way to obtain this would be by means of carrier aggregation. Carrier aggregation implies that a future-release UE can receive multiple component carriers, where the component carriers have, or at least have the possibility of having, the same structure as a carrier of previous releases.

Carrier aggregation is illustrated in FIG. 5 where five component carriers 50, each of 20 MHz bandwidth, have been aggregated to form a bandwidth of 100 MHz. The number of aggregated component carriers as well as the bandwidth of the individual component carrier may be different for uplink (UL) and downlink (DL). A symmetric configuration refers to the case where the number of component carriers in DL and UL is the same whereas an asymmetric configuration refers to the case that the number of component carriers is different. It should be noted that the number of component carriers configured in a coverage area may be different from the number of component carriers seen by a UE. A UE may for example support more DL component carriers than UL component carriers, even though the coverage area is configured with the same number of UL and DL component carriers.

A straight forward extension of current E-UTRAN is to use PDCCH transmitted on a certain component carrier to schedule the PDSCH, which is transmitted on the same component carrier. However, in certain scenarios it is desirable to enable cross-scheduling, i.e. PDCCH is transmitted on a first component carrier whereas the corresponding PDSCH resides on another component carrier. To identify the component carrier the PDSCH is located on a Carrier Indicator Field (CIF) is included in the PDCCH.

With above outlined CIF a particular component carrier can be used to schedule the PDSCH on multiple component carriers. If we assume the same transmission bandwidth on each component carrier as well as the same transmission mode, the DCI format sizes containing the assignments are the same for all component carriers. Thus, a UE has to monitor PDCCHs of certain sizes. After decoding and verifying that the assignment is indeed for the UE, the component carrier containing the actual assignment (i.e. PDSCH) is known from the CIF.

However, in case the component carriers that can be scheduled from one component carrier have different bandwidths also the payload sizes of the DCI messages vary across the component carriers. Moreover, for each payload size a certain number of code word sizes needs to be monitored by the UE, increasing the number of blind decodings. Thus, the component carriers having different bandwidths results in an increased number of blind decodings.

A state-of-the-art solution to this problem is to provide one resource allocation message to allocate resources on more than one component carrier. This is performed by allowing existing control signaling to indicate a larger set of resource blocks than in networks in which carrier aggregation is not applied. This solution results in reduced sizes of the resource allocation fields in the DCI messages addressing wider component carriers. The sizes are reduced to the size used on the component carrier carrying the PDCCH, resulting in coarser resource allocations on the cross-scheduled component carriers having wider bandwidths. For cross-scheduled component carriers having narrower bandwidths the resource allocation field is extended, resulting in finer resource allocations. However, there is a need for a solution when the scheduling component carrier is wide and the cross-scheduled component carriers are narrower, providing a smaller amount of overhead.

SUMMARY

It is therefore an object of the present invention to address some of the problems and disadvantages outlined above and to provide methods and arrangements for resource allocation in a telecommunication system in which aggregation of component carriers is applied.

The above stated object is achieved by means of a method and an arrangement according to the independent claims, and by the embodiments according to the dependent claims.

According to a basic concept of the present invention the size of the resource allocation field is determined based on the transmission bandwidth of a selection of component carriers. The selection of component carriers includes the component carrier on which the resource allocation message is monitored and the component carriers which are cross-scheduled from said component carrier. The present invention enables a more tailored approach when determining the size of the resource allocation field to avoid too high overhead but also a too coarse resource allocation. Moreover, with only one size of the resource allocation field a smaller number of code word sizes needs to be monitored by the UE. This leads to a smaller number of blind decodings performed in the UE.

According to a first aspect of the present invention a method for a radio base station in a telecommunication system is provided. The radio base station is configured to transmit and receive data to and from a user equipment over a plurality of component carriers. Furthermore, each component carrier of the plurality of component carriers has a transmission bandwidth, respectively. The method comprises determining a size of a resource allocation field based on the transmission bandwidths of a selection of component carriers from the plurality of component carriers. It further comprises transmitting to the user equipment, over a particular component carrier of the selection of component carriers, a resource allocation message comprising the resource allocation field with the determined size.

According to a second aspect of the present invention a method for a user equipment in a telecommunication system is provided. The user equipment is configured to transmit and receive data to and from a radio base station comprised in the telecommunication system over a plurality of component carriers. Moreover, each component carrier of the plurality of component carriers has a transmission bandwidth, respectively. The method comprises receiving from the radio base station a resource allocation message over a particular component carrier of the plurality of component carriers. The resource allocation message comprises a resource allocation field with a size that is determined based on the transmission bandwidths of a selection of component carriers from the plurality of component carriers.

According to a third aspect of the present invention a radio base station for a telecommunication system is provided. The radio base station is configured to transmit and receive data to and from a user equipment over a plurality of component carriers. Furthermore, each component carrier of the plurality of component carriers has a transmission bandwidth, respectively. The radio base station comprises a unit for determining a size of a resource allocation field based on the transmission bandwidths of a selection of component carriers from the plurality of component carriers. It further includes a transmitter for transmitting to the user equipment, over a particular component carrier of the selection of component carriers, a resource allocation message comprising the resource allocation field with the determined size.

According to a fourth aspect of the present invention a user equipment for a telecommunication system is provided. The user equipment is configured to transmit and receive data to and from a radio base station comprised in the telecommunication system over a plurality of component carriers. Moreover, each component carrier of the plurality of component carriers has a transmission bandwidth, respectively. The user equipment comprises a receiver for receiving, from the radio base station, a resource allocation message over a particular component carrier of the plurality of component carriers. Furthermore, the resource allocation message comprises a resource allocation field with a size that is determined based on the transmission bandwidths of a selection of component carriers from the plurality of component carriers.

An advantage of embodiments of the present invention is that they decrease overhead in the telecommunication system.

Another advantage of embodiments of the present invention is that they provide a more efficient resource allocation management.

Yet another advantage of embodiments of the present invention is that they provide a tailored approach when determining the size of the resource allocation field avoiding high overhead but also a too coarse resource allocation.

Yet another advantage of embodiments of the present invention is that they reduce the amount of blind decodings performed in the user equipment by aligning sizes of resource allocation messages in the telecommunication system.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1:
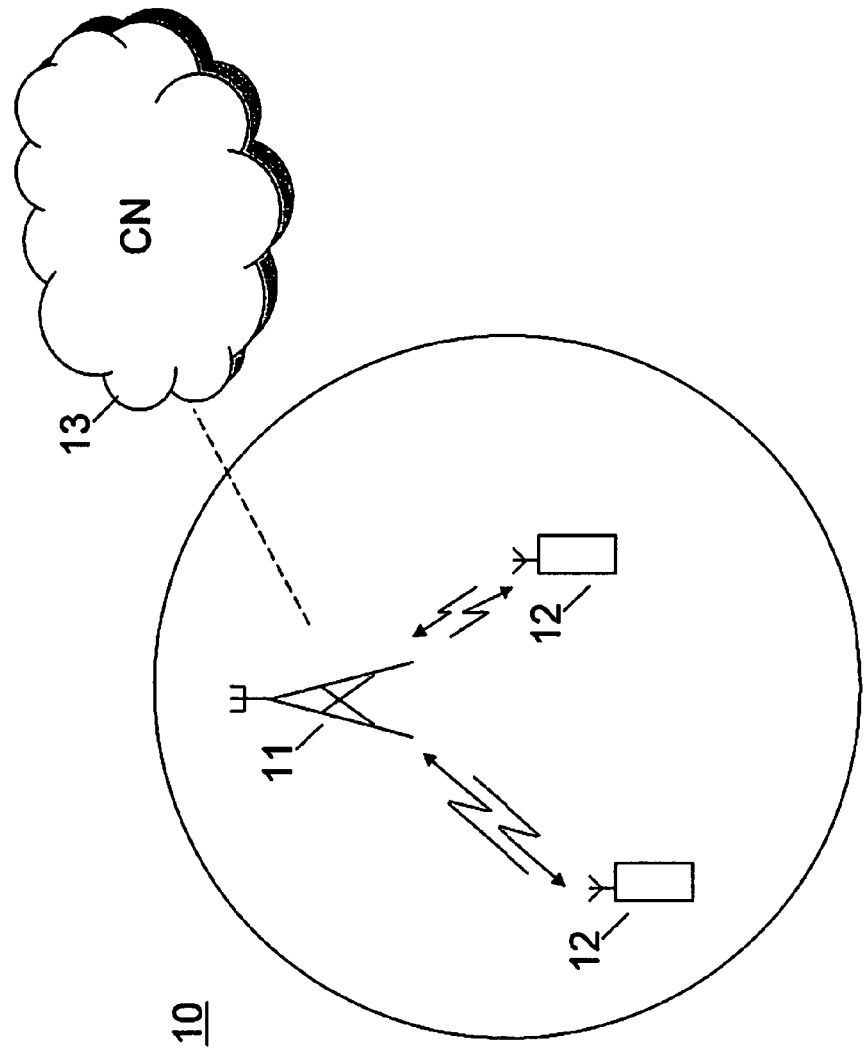
FIG. 1 depicts schematically a telecommunication system, wherein embodiments of the present invention may be implemented.
Figure 2:
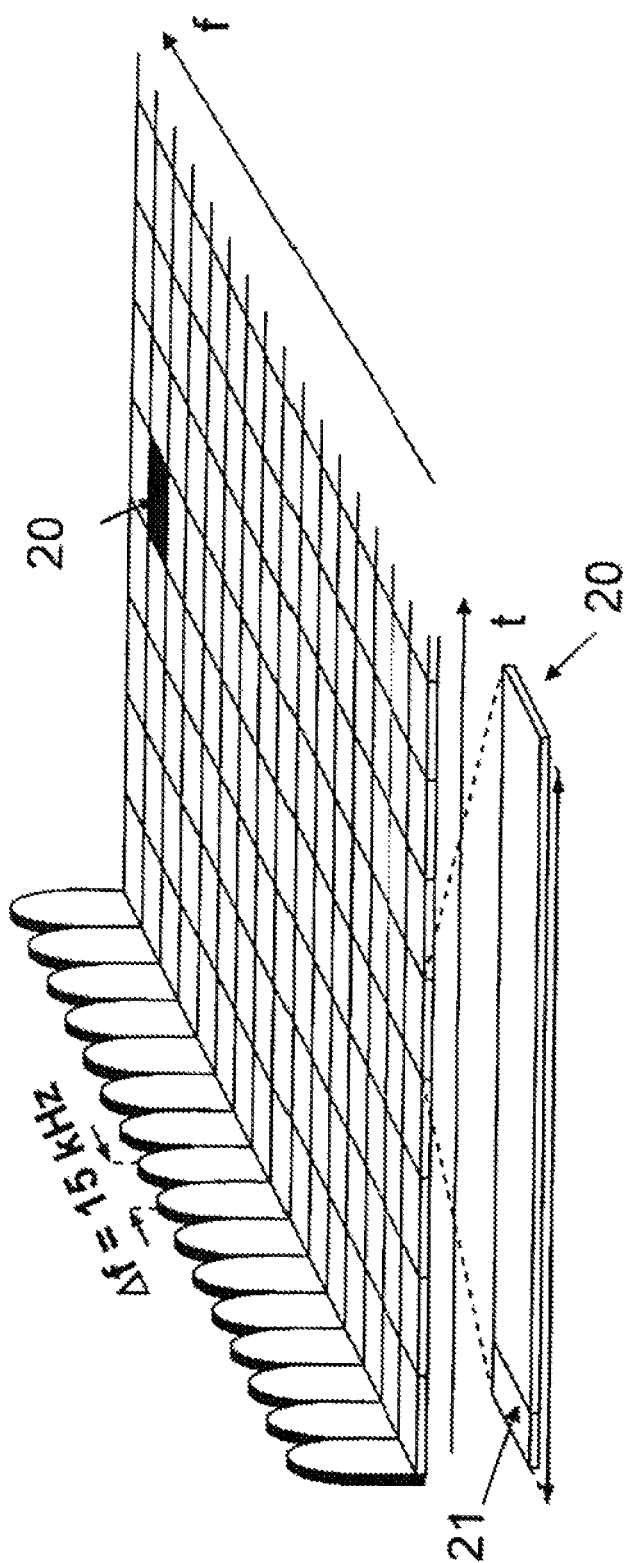
FIG. 2 depicts a time-frequency grid illustrating the LTE downlink physical resource.
Figure 3:
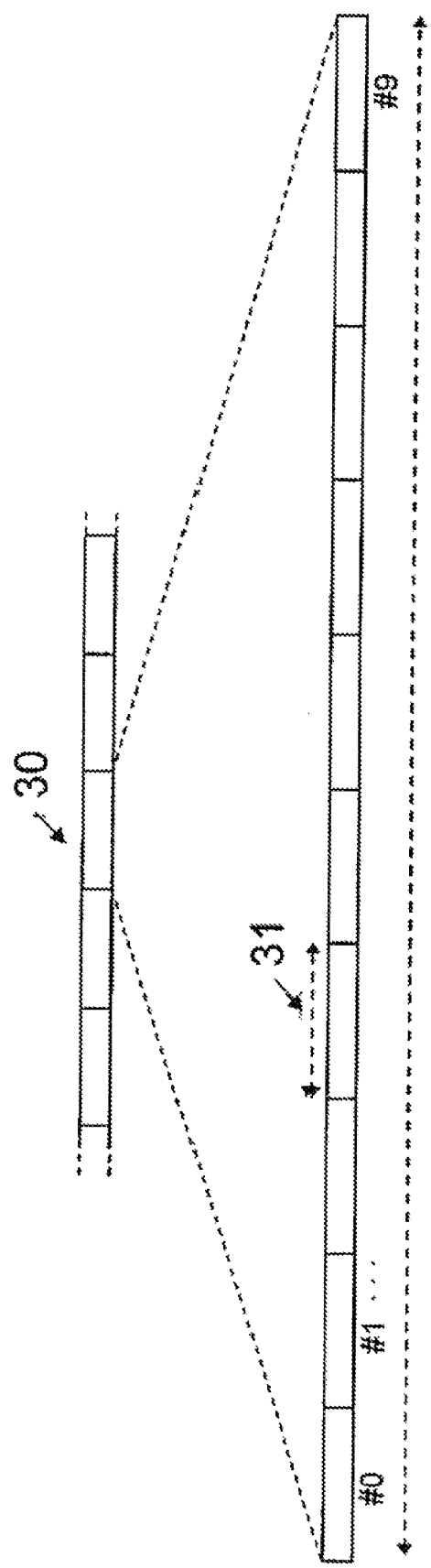
FIG. 3 illustrates the time-domain structure in the telecommunication system, wherein embodiments of the present invention may be implemented.
Figure 4:
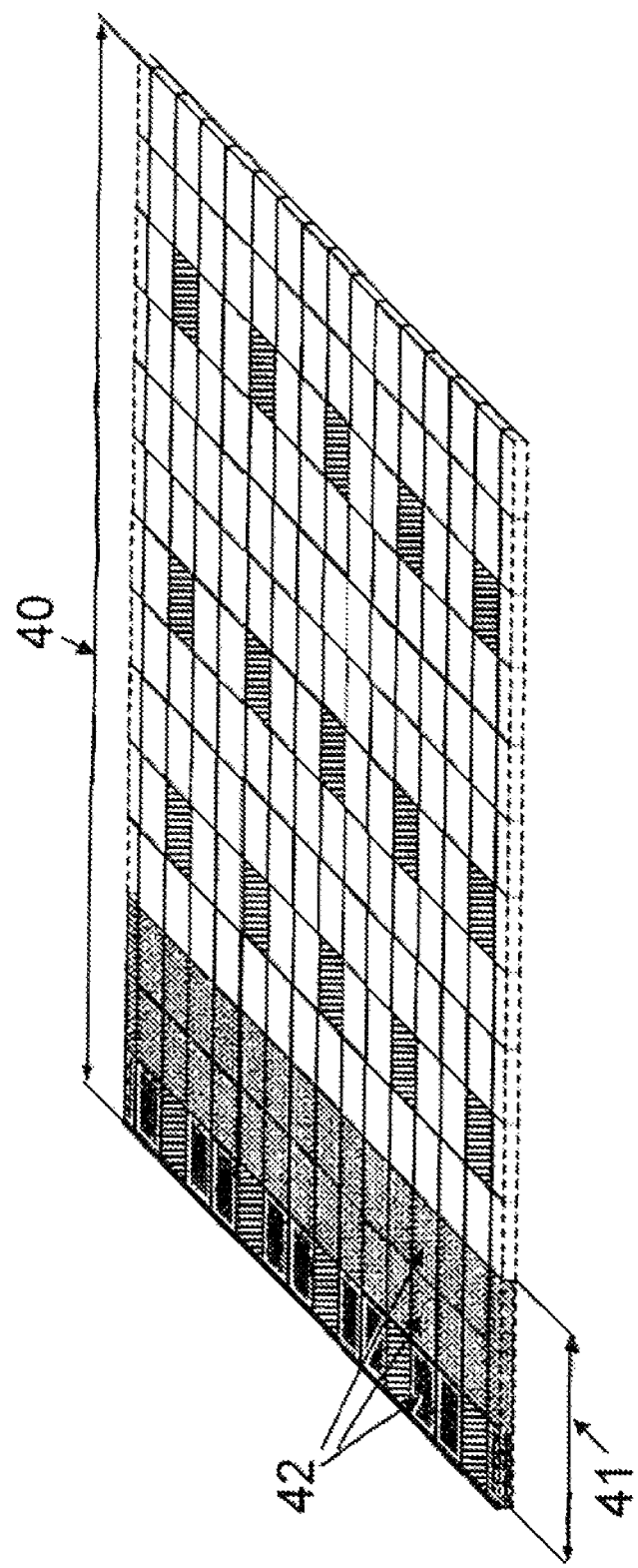
FIG. 4 illustrates the downlink subframe structure in the telecommunication system, wherein embodiments of the present invention may be implemented.
Figure 5:
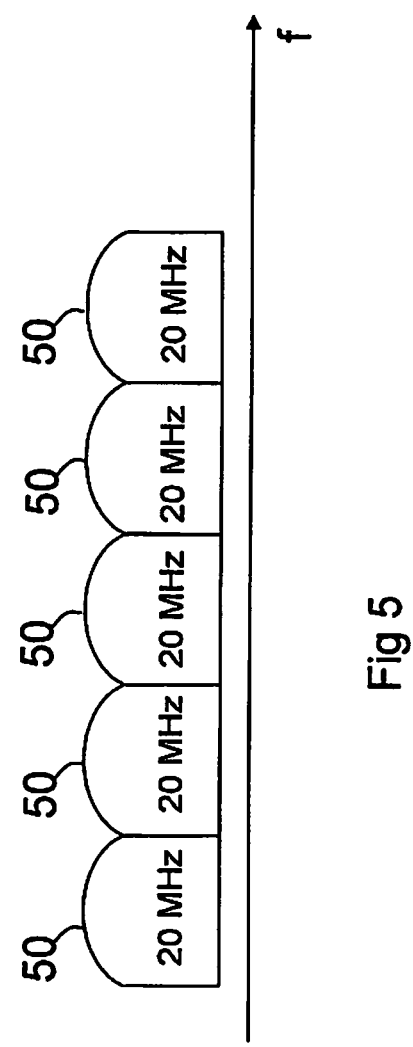
FIG. 5 shows a plurality of aggregated component carriers.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an E-UTRAN. It should though be noted that the invention and its exemplary embodiments may also be applied to other types of radio access networks in which aggregation of component carriers is applied.

In a telecommunication system in which aggregation of a plurality of component carriers is applied, the component carriers that can be scheduled from one component carrier could have different bandwidths. Thus, also the sizes of the resource allocation fields in the resource allocation messages, e.g. the payload sizes of the DCI messages, vary across the component carriers. Moreover, for each size of the resource allocation field a certain number of code word sizes needs to be monitored by the UE. This leads to an increase of the number of blind decodings performed in the UE. Thus, carrier aggregation of a plurality of component carriers having different bandwidths results in an increased number of blind decodings.

According to the basic concept of the present invention the size of the resource allocation field is determined based on the transmission bandwidth of a selection of component carriers. The selection of component carriers includes the component carrier on which the resource allocation message is monitored and the component carriers which are cross-scheduled from said component carrier. The present invention enables a more tailored approach when determining the size of the resource allocation field to avoid too high overhead but also a too coarse resource allocation. Moreover, with only one size of the resource allocation field a smaller number of code word sizes needs to be monitored by the UE. This leads to a smaller number of blind decodings performed in the UE.

In the following the above embodiments will be further explained with reference to FIGS. 6, 7 and 8.

Figure 6:
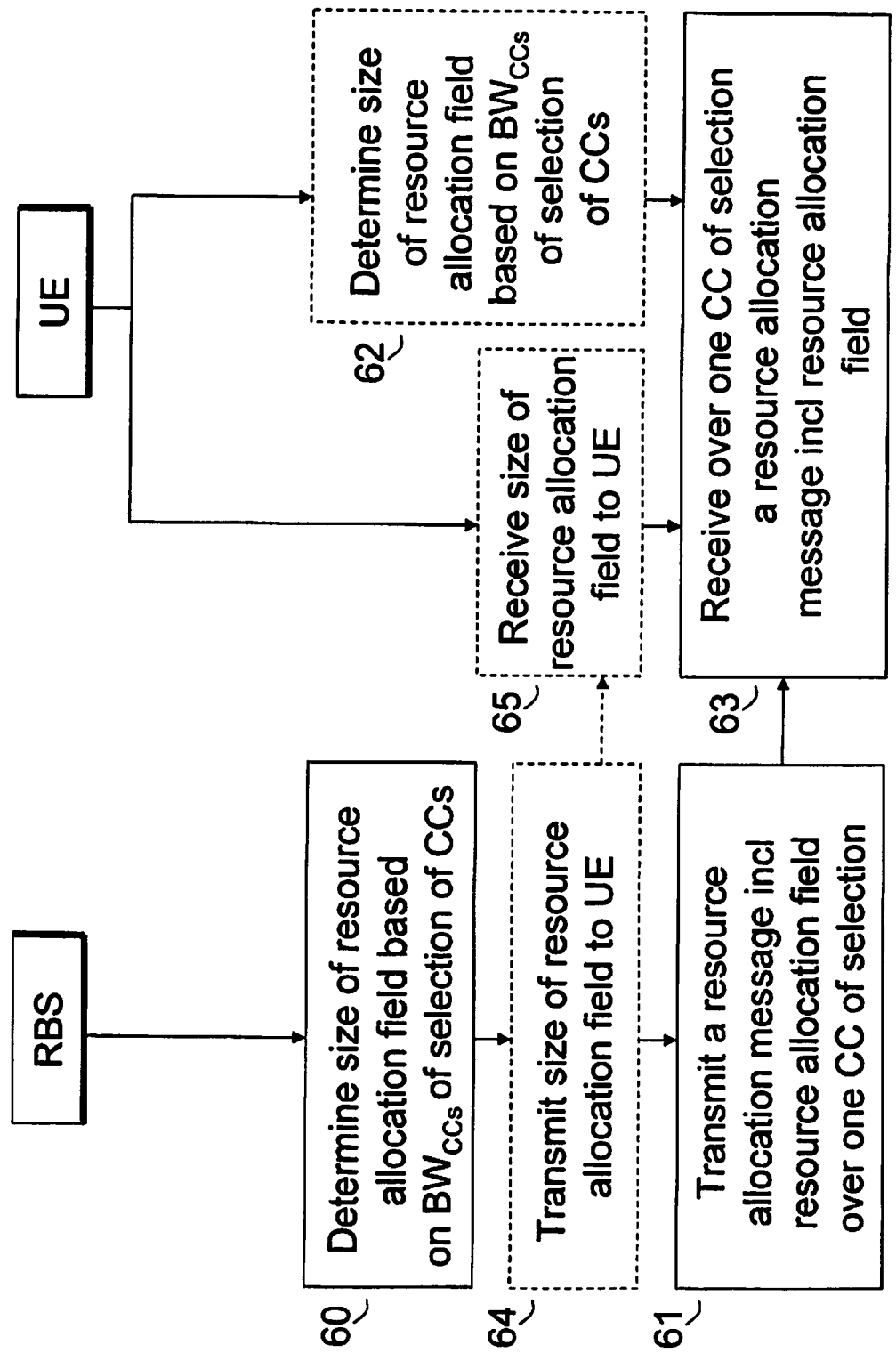
FIG. 6 shows flowcharts of the methods according to embodiments of the present invention performed in the base station and the user equipment, respectively.

FIG. 6 shows flowcharts of the methods according to embodiments of the present invention performed in a base station and a user equipment for use in a telecommunication system in which carrier aggregation is applied. The radio base station is configured to transmit and receive data to and from a user equipment over a plurality of component carriers. In the telecommunication system the number of aggregated component carriers as well as the bandwidth of the individual component carrier may vary. In a step 60, the base station determines a selection of component carriers from the plurality of component carriers on which resources are allocated. The selection of component carriers could comprise all the component carriers on which the DL assignment is allocated or on which the UL grant is allocation. Another selection of component carriers could include all the component carriers on which both the DL assignment and the UL grant are allocated. Thereupon, a size of a resource allocation field is determined. The size of the resource allocation field is based on the transmission bandwidths of the selection of component carriers. Moreover, the radio base station transmits in a step 61 to the user equipment a resource allocation message such as a DCI message comprising the resource allocation field with the determined size informing the UE of the allocated resources i.e. DL assignment or UL grant. The resource allocation message is transmitted over a particular component carrier of the selection of component carriers. It should be mentioned that the radio base station transmits one resource allocation message for each component carrier of the selection component carriers over the particular component carrier. Each message includes information of the DL assignment or UL grant for each component carrier of the selection component carriers.

In an exemplary embodiment in which carrier aggregation is applied, resources are allocated on a first component carrier and a second component carrier with vastly different bandwidths. The radio base station determines a selection of component carriers i.e. the first and the second component carrier from the plurality of aggregated component carriers. Assume that the first component carrier has a narrow bandwidth and the second component carrier has a vastly wider bandwidth. In accordance with the present invention the size of the resource allocation field is determined to be somewhere in-between these two values. If the size of the resource allocation field would be based on only the first component carrier with the narrow bandwidth this would enable only very coarse resource allocations on the second component carrier with the wider bandwidth. On the other hand, if the size of the resource allocation field would be based on only the second component carrier with the wider bandwidth this would results in increased and unnecessary overhead. Thus, the present invention provides a tailored approach when determining the size of the resource allocation field avoiding high overhead but also a too coarse resource allocation.

In an embodiment of the present invention the size of the resource allocation field is based on an average or a weighted of the transmission bandwidths of the selection of component carriers, i.e. the bandwidths of the component carriers on which resources have been allocated. The average of the transmission bandwidths could be calculated as $$BW_{RA} = \left( \frac{1}{N_{CC}} \sum_{n=1}^{N_{CC}} w_n \cdot BW_{CC,n} \right)$$

wherein $N_{CC}$ is the number of the selection of component carriers that can be scheduled from a particular component carrier. The particular component carrier is the component carrier the PDCCH is transmitted upon. $BW_{CC,n}$ is the individual transmission bandwidth of each component carrier and $w_n$ is a component carrier specific weight used for the averaging. The weights $w_n$ can be configured by the core network or set to predefined values, e.g. all weights set to the value 1. The size of the resource allocation field is then based on the transmission bandwidth $BW_{RA}$.

An advantage of the embodiment applying a weighted average is that if the core network intends to cross-schedule a UE primary on one component carrier this component carrier could have a higher influence than others when deciding the size of the resource allocation field. The weights $w_n$ could be configured based on how the core network intends to schedule the UE and how to use certain component carriers, e.g. to use a certain component carrier primary for voice and another component carrier for data etc.

In another embodiment of the present invention the average or weighted average of the transmission bandwidths $BW_{RA}$ is rounded to a standardized transmission bandwidth and thereupon the size of the resource allocation field is then based on the rounded transmission bandwidth.

In yet another embodiment of the present invention the radio base station comprises a stored association between combinations of transmission bandwidths of the plurality of component carriers allowed in the telecommunication system and corresponding sizes of a resource allocation field. For example, the combinations and corresponding sizes could be listed in a table comprised in the base station. In such an embodiment the radio base station determines the size of the resource allocation field in step 61 by selecting the size associated with the combination corresponding to the selection of component carriers from the table.

In one embodiment of the present invention the determination of the size of the resource allocation field could be determined also in the user equipment. Moreover, in a step 62 the user equipment determines a selection of component carriers from the plurality of component carriers on which resources are allocated. Thereupon, a size of the resource allocation field is determined. The size of the resource allocation field is based on the transmission bandwidths of the selection of component carriers in the same manners as described above. The user equipment is then able to monitor the determined size of the resource allocation field on the PDCCH carrying the particular component carrier that can cross-schedule, i.e. allocate resources, the selection of component carriers. Moreover, the user equipment receives in a step 63 from radio base station a resource allocation message such as a DCI message comprising the resource allocation field. The resource allocation message is received over the particular component carrier of the selection of component carriers. It should be mentioned that the user equipment receives one resource allocation message for each component carrier of the selection component carriers over the particular component carrier. Each message includes information of the DL assignment or UL grant for each component carrier of the selection component carriers used by the user equipment.

In one embodiment of the present invention the user equipment comprises a stored association between combinations of transmission bandwidths of the plurality of component carriers allowed in the telecommunication system and corresponding sizes of a resource allocation field. For example, the combinations and corresponding sizes could be listed in a table comprised in the user equipment. In such an embodiment the user equipment determines the size of the resource allocation field in step 62 by selecting the size associated with the combination corresponding to the selection of component carriers from the table.

In another embodiment of the present invention the size of the resource allocation field is determined only in the radio base station and then transmitted to the user equipment as can be seen in a step 64 in FIG. 6. The user equipment receives information of the size of the resource allocation field in step 65 and is then able to monitor the determined size of the resource allocation field on the PDCCH carrying the particular component carrier that can cross-schedule, i.e. allocate resources, the selection of component carriers.

It should also be pointed out that if a user equipment is configured with multiple transmission modes in the telecommunication system, different sizes of the resource allocation field may be used for the different transmission modes in order to obtain one size of the resource allocation message to be monitored by the user equipment.

Figure 7:
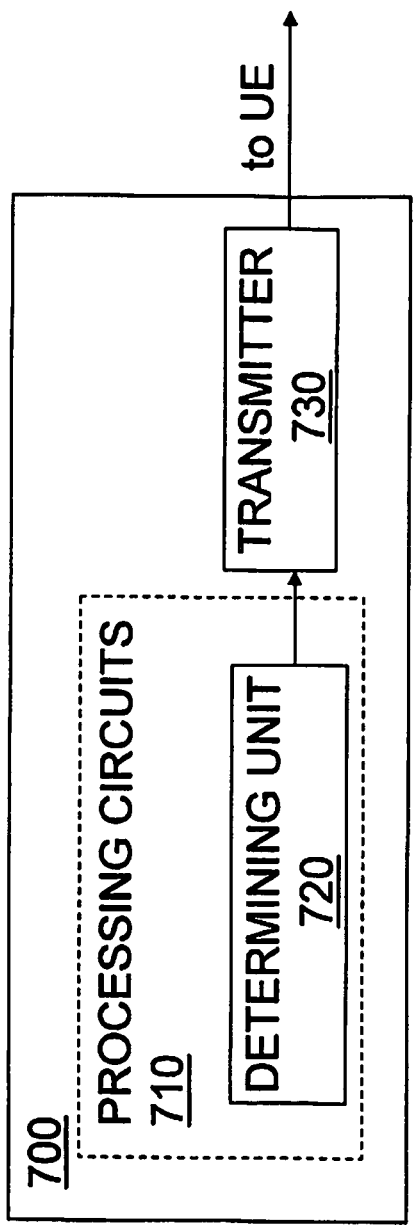
FIG. 7 is a schematic block diagram illustrating a radio base station according to an embodiment of the present invention.

Schematically illustrated in FIG. 7 and according to embodiments described previously, the radio base station 700 comprises a unit for determining 720 a size of a resource allocation field based on the transmission bandwidths of the selection of component carriers from the plurality of component carriers. It further includes a transmitter for transmitting 730 to the user equipment, over a particular component carrier of the selection of component carriers, a resource allocation message comprising the resource allocation field with the determined size. In one embodiment the transmitter further transmits the determined size of the resource allocation field to the user equipment.

Figure 8:
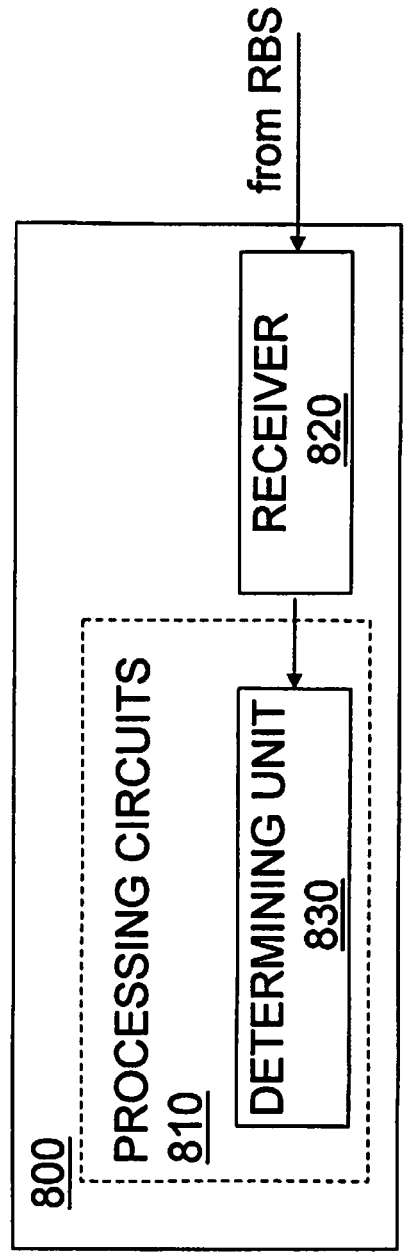
FIG. 8 is a schematic block diagram illustrating a user equipment according to an embodiment of the present invention.

Schematically illustrated in FIG. 8 and according to embodiments described previously, the user equipment 800 comprises a receiver for receiving 820 from the radio base station a resource allocation message over a particular component carrier of the plurality of component carriers. The resource allocation message comprises a resource allocation field with a size that is determined based on the transmission bandwidths of a selection of component carriers from the plurality of component carriers. In one embodiment the receiver also receives the size based on the transmission bandwidths of the selection of component carriers from the radio base station. In another embodiment of the present invention the user equipment 800 additionally comprises a unit for determining 830 the selection of component carriers from the plurality of component carriers and for determining the size based on the transmission bandwidths of the selection of component carriers.

It should be noted that the units illustrated in FIGS. 7 and 8, could be implemented as a single unit or be divided into several units, respectively. The units may be implemented by physical or logical entities such as processing circuits 710, 810 using software functioning in conjunction with a programmed microprocessor or a general purpose computer, and/or using an application specific circuit (ASIC).

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for a radio base station in a telecommunication system, the radio base station being configured to transmit and receive data to and from a user equipment over a plurality of component carriers, each component carrier having a transmission bandwidth, respectively, the method comprising:
   determining a size of a resource allocation field based on a weighted average of the transmission bandwidths of the component carriers, wherein the weighting is based on an intended use of the component carriers by a core network; and
   transmitting to the user equipment, over a particular component carrier of the component carriers, a resource allocation message comprising the resource allocation field with the determined size.

2. The method of claim 1, wherein the average of the transmission bandwidths of the selection of component carriers is rounded to a standardized transmission bandwidth.

3. The method of claim 1, further comprising transmitting the determined size of the resource allocation field to the user equipment.

4. The method of claim 1, wherein the resource allocation message indicates allocated resources for at least one of downlink and uplink communication.

5. A method for a user equipment in a telecommunication system, the user equipment being configured to transmit and receive data to and from a radio base station comprised in the telecommunication system over a plurality of component carriers, each component carrier having a transmission bandwidth, respectively, the method comprising:
   receiving from the radio base station a resource allocation message, over a particular component carrier of the plurality of component carriers, the resource allocation message comprising a resource allocation field with a size that is determined based on a weighted average of the transmission bandwidths of the component carriers and wherein the weighting is based on an intended use of the component carriers by a core network.

6. The method of claim 5, wherein the average of the transmission bandwidths of the selection of component carriers is rounded to a standardized transmission bandwidth.

7. The method of claim 5, wherein the resource allocation message indicates allocated resources for at least one of downlink and uplink communication.

8. A radio base station for a telecommunication system, the radio base station being configured to transmit and receive data to and from a user equipment over a plurality of component carriers, each component carrier having a transmission bandwidth, respectively, the radio base station comprising:
   a unit configured to determine a size of a resource allocation field based on a weighted average of the transmission bandwidths of the component carriers, wherein the weighting is based on an intended use of the component carriers by a core network; and
   a transmitter configured to transmit to the user equipment, over a particular component carrier, a resource allocation message comprising the resource allocation field with the determined size.

9. The radio base station of claim 8, wherein the average of the transmission bandwidths of the selection of component carriers is rounded to a standardized transmission bandwidth.

10. The radio base station of claim 8, wherein the transmitter is further configured to transmit the determined size of the resource allocation field to the user equipment.

11. The radio base station of claim 8, wherein the resource allocation message indicates allocated resources for at least one of downlink and uplink communication.

12. A user equipment for a telecommunication system, the user equipment being configured to transmit and receive data to and from a radio base station comprised in the telecommunication system over a plurality of component carriers, each component carrier having a transmission bandwidth, respectively, the user equipment comprising:
   a receiver configured to receive, from the radio base station, a resource allocation message over a particular component carrier of the plurality of component carriers, the resource allocation message comprising a resource allocation field with a size that is determined based on a weighted average of the transmission bandwidths of the component carriers and wherein the weighting is based on an intended use of the component carriers by a core network.

13. The user equipment of claim 12, wherein the average of the transmission bandwidths of the selection of component carriers is rounded to a standardized transmission bandwidth.

14. The user equipment of claim 12, wherein the resource allocation message indicates allocated resources for at least one of downlink and uplink communication.

* * * * *